March 28, 1967 A. FISCHBACH 3,310,842
INJECTION MOULDING APPARATUS LOCKING DEVICE
Filed Feb. 26, 1965 2 Sheets-Sheet 1
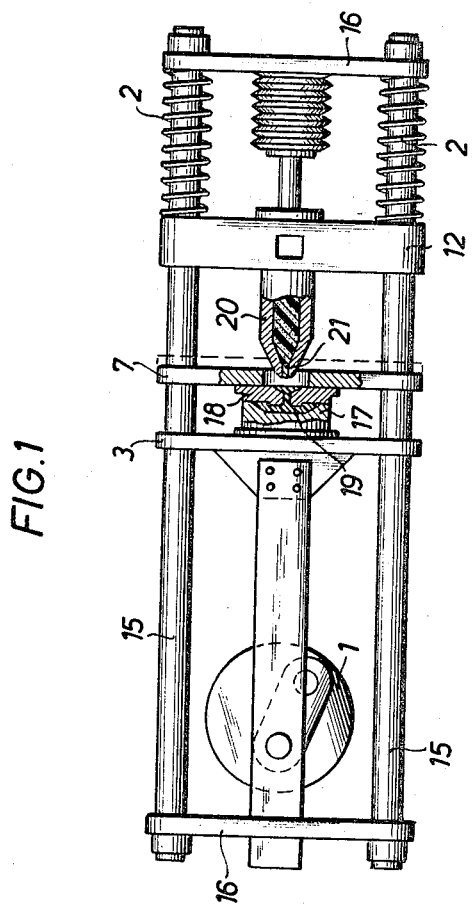
INVENTOR
Alfred Fischbach
by
Michael S. Striker

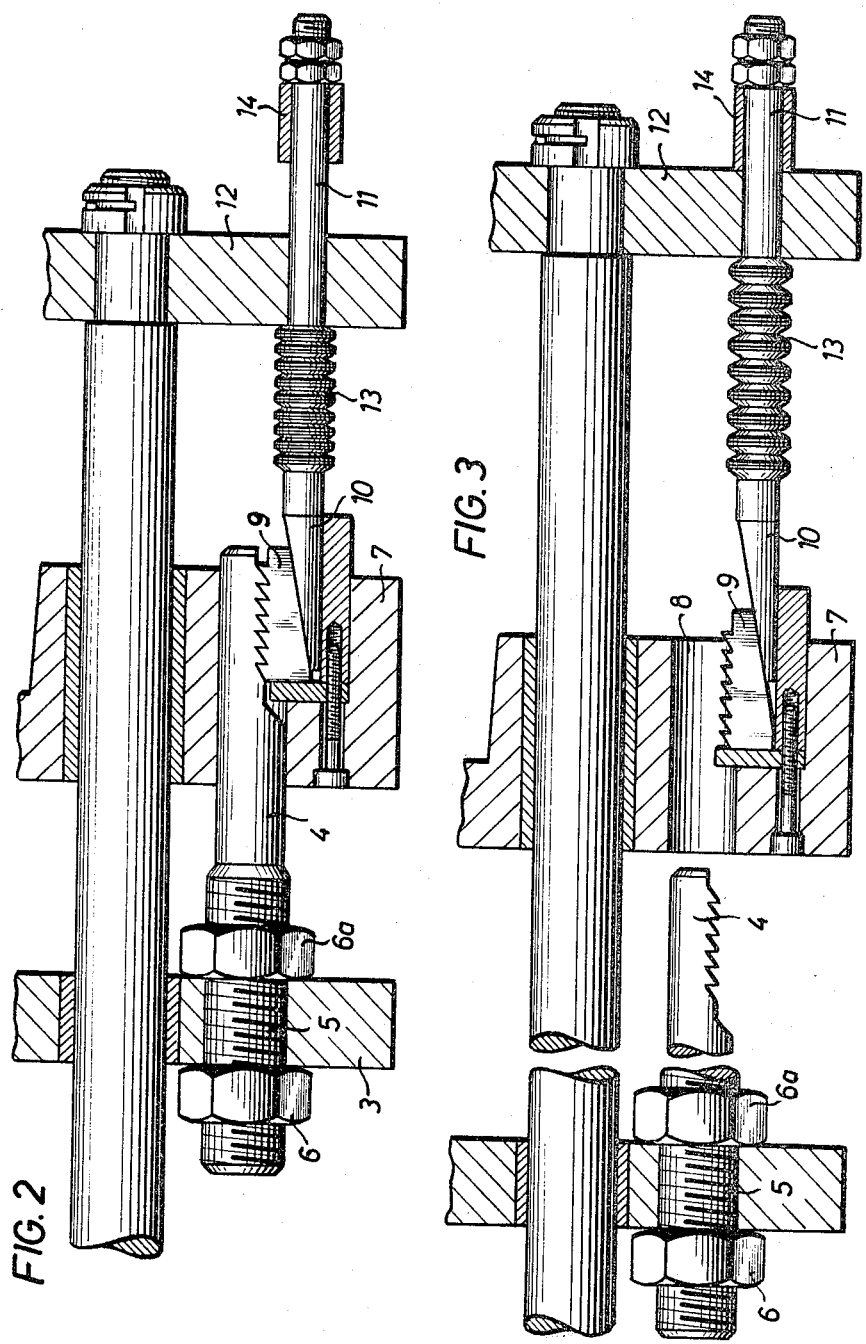

3,310,842
INJECTION MOULDING APPARATUS
LOCKING DEVICE
Alfred Fischbach, Am Scheffert, Runderoth,
Bezirk, Cologne, Germany
Filed Feb. 26, 1965, Ser. No. 435,747
Claims priority, application Germany, Mar. 21, 1964,
E 26,685
6 Claims. (Cl. 18—30)

This invention concerns an injection moulding apparatus having two mould clamping plates supporting the mould parts and adapted to be displaced axially relative to one another, a single driving unit being adapted to effect the mould closing movement and the injection movement.

Injection moulding machines have been proposed wherein the mould closing movement is carried out by a single driving unit. In such machines the mould is generally closed, then the closed mould is progressively displaced in the direction of the nozzle of the injection cylinder and subsequently the injection cylinder itself is displaced in the direction of a stationary injection piston, so that the liquefied injection compound contained in the cylinder is forced into the mould cavity. Injection moulding machines have also been proposed having a crank drive. In such machines it is possible to maintain an adequately long mould closing period (cooling period) by employing springs to ensure that the mould remains closed after passing the front dead centre position.

The disadvantage of the above machines is that the ratio between the mould closing force and injection force cannot practically be varied. The only possibility of adjustment would consist in the varying of the diameter of the injection piston. This however would be accompanied by the disadvantage of reducing the injection volume. Moreover the specific injection pressure would increase so that mould opening force would also be increased. In such machines the limit of their operation is repeatedly found in small projected surfaces of the mouldings.

The object of the invention is to minimize these deficiencies. According to the invention an injection moulding machine comprises an additional locking device resiliently mounted on a non-movable part of the apparatus and adapted during injection additionally to lock the mould parts and on completion of the injection operation to release this additional locking.

The additional locking device conveniently consists of a ratchet coupling of which one coupling part is secured to the mould clamping plate and the other coupling part is adapted to be displacable at right angles to the first coupling part by means of a control wedge resiliently supported on the stationary non-movable part of the injection moulding machine, and finally the control wedge is adapted to be moved into coupling engagement and out of coupling engagement by a further, identical, wedge surface. The advantage of this is that by means of mechanical locking at the critical moment of injection additional mould retention is obtained when the maximum mould opening force becomes effective.

In one embodiment of the invention the ratchet coupling parts comprise racked bars, with the advantage of simplicity and ensurance of a reliable closing force.

A further advantage according to the invention is obtained by the fact that the racked bar secured to a mould clamping plate is adapted to be inserted in an opening of the other mould clamping plate and the other racked bar is displaceable at right angles thereto in this same opening.

In an alternative embodiment of the invention the racket bar secured to one of the mould clamping plates is adapted to be axially adjustable relative to this mould clamping plate. This measure is of particular importance because it makes it possible for the additional locking device to be also most accurately adjusted even after installation.

The same object is served according to the invention by a further modification which consists in that the control wedge is secured to a bolt which is slidably engaged in the non-movable part of the injection moulding machine, and the locking movement of the bolt is effected against the pressure of a spring, whilst when releasing the locking the opposite movement of the bolt is limited by means of an adjustable stop of the bolt.

The accompanying drawings illustrate a known embodiment and an embodiment in accordance with the invention, the latter as an example of the invention; in the drawings:

FIG. 1 shows a plan of a known embodiment of an injection moulding apparatus.

FIG. 2 shows a longitudinal section of part of the injection moulding apparatus of FIG. 1 on which an additional locking device in accordance with the invention is mounted.

FIG. 3 is a section corresponding to FIG. 2 showing a different position of the parts relative to one another.

In the drawings like parts are denoted by like reference numerals.

The known embodiment illustrated in FIG. 1 shows the general structure of such a machine. Stringers 15 are interconnected by means of traverses 16. Mould clamping member, e.g. plates 3 and 7 are displaceable on the stringers 15. The mould clamping plates 7 support mould parts 17 and 18 and a mould cavity 19 is situated between them. An injection cylinder 20 with injection nozzle 21 is mounted on a non-displaceable cross member 12. Between transverse member 12 and the traverse 16 springs 2 are clamped. The drive consists of a crank drive 1 which rotates constantly. The springs 2 ensure that after traversing the front dead centre position the mould 17, 18 remains closed. The cooling time is obtained from the value $x$.

In the embodiment in accordance with the invention as shown in FIGS. 2 and 3 one or more racked bars 4 are mounted on the displaceable mould clamping plate 3, which bars are movable by means of a thread 5 and adjustable by means of lock nuts 6, 6a. FIG. 2 shows the position of the parts when the mould is closed, whilst FIG. 3 illustrates the position of the parts with the mould opened.

Bores 8 are formed in the second mould clamping plate 7 into which bores the racked bar 4 is adapted to slide during the mould closing movement. Since the two mould halves 17, 18, see FIG. 1, are supported against one another, the movement of the mould clamping plate 3 is transmitted to the mould clamping plate 7. In this case a counter member 9 corresponding to the racked bar 4 is moved by means of a wedge 10 at right angles to the movement of the mould plates until, as shown in FIG. 2, it is in engagement with the racked bar 4. The shaft 11 supporting the wedge 10 is mounted so as to be longitudinally displaceable in the fixed cross member 12. The force for displacement of the wedge 10 relative to the plate 7 is produced preferably by means of a spring assembly 13.

During injection the mechanical locking obtained by means of the parts 4, 9 and 10 in the critical moment of injection at which the maximum mould opening force becomes effective, produces an additional mould closing effect. Opening this additional locking system is effected during the mould opening movement by stopping the axial movement of bolt 11 by means of the stop bush 14, the position of which is adjustable and caused to be brought against a stop for braking the movement of the mould clamping plate.

I claim:

1. Injection moulding apparatus comprising a non-movable part and two relatively displaceable mould clamping members mounted therein, cooperating locking members each mounted on one of said clamping members, mould parts being supported by the clamping members, an injection device for charging the mould parts and single drive means for closing the mould parts and operating the injection device, in which an additional locking device resiliently mounted on the non-movable part of the apparatus engages at least one of said co-operating locking members during movement thereof so as to lock said cooperating locking members for locking the mould parts together during operation of the injection device.

2. Injection moulding apparatus as claimed in claim 1 in which the additional locking device comprises a ratchet coupling having two parts, one of which coupling parts is secured to one of the mould clamping members, the other coupling part being displaceable relative thereto, a control wedge resiliently supported on the non-moveable part of the apparatus for displacing said other coupling part and a wedge surface on said other coupling part for displacing the control wedge.

3. Injection moulding apparatus as claimed in claim 2 in which the ratchet coupling parts are racked bars.

4. Injection moulding apparatus as claimed in claim 3 in which the mould clamping member secured to one of the racked bars has an opening into which the racked bar is adapted to be advanced and the other racked bar is displaceable in the opening transversely of the first mentioned rack bar.

5. Injection moulding apparatus as claimed in claim 3 in which one of the racked bars is axially displaceably secured to one of the clamping members.

6. Injection moulding apparatus as claimed in claim 2 in which a bolt is slidably engaged in the non-movable part of the apparatus and secured to the control wedge, a spring being associated with the bolt for biasing it into an unlocked position and an adjustable stop being provided on the bolt for limiting its unlocking movement.

References Cited by the Examiner
UNITED STATES PATENTS

| | | | |
|---|---|---|---|
| 2,319,479 | 5/1943 | Ryder | 18—30 |
| 2,452,382 | 10/1948 | Long | 18—16 |
| 2,894,282 | 7/1959 | Harvey | 18—16 |
| 3,174,187 | 3/1965 | Schriever | 18—30 |

J. SPENCER OVERHOLSER, *Primary Examiner.*

J. HOWARD FLINT, JR., *Examiner.*